United States Patent [19]

Kawakami

[11] Patent Number: 4,813,857
[45] Date of Patent: Mar. 21, 1989

[54] ROOTS BLOWER

[75] Inventor: Toshiro Kawakami, Obu, Japan

[73] Assignee: Aisin Seiki Kabushiki Kaisha, Kariya, Japan

[21] Appl. No.: 30,486

[22] Filed: Mar. 27, 1987

[30] Foreign Application Priority Data

Mar. 31, 1986 [JP] Japan .................. 61-73708

[51] Int. Cl.⁴ .......................................... F04C 18/18
[52] U.S. Cl. ..................................... 418/104; 418/206
[58] Field of Search ............... 418/75, 95, 180, 206, 418/104; 384/135, 144, 147, 478, 479, 480, 484, 485, 488; 277/27, 53, 95

[56] References Cited

U.S. PATENT DOCUMENTS

| | | | |
|---|---|---|---|
| 2,275,325 | 3/1942 | Searles | 277/168 |
| 2,779,532 | 1/1957 | Herschmann | 418/206 |
| 2,917,328 | 12/1959 | Peterson | 384/479 |
| 3,113,814 | 12/1963 | Ogura | 384/484 |
| 3,642,335 | 2/1972 | Takahashi | 384/485 |
| 3,709,572 | 1/1973 | Pethis | 384/485 |
| 4,465,442 | 8/1984 | Lang | 418/206 |
| 4,557,612 | 12/1985 | Neal | 384/488 |
| 4,594,992 | 6/1986 | Naramura | 418/104 |
| 4,655,617 | 4/1987 | Yasui | 384/488 |
| 4,657,495 | 4/1987 | Sakamaki | 418/95 |
| 4,709,682 | 12/1987 | Kato | 418/104 |

FOREIGN PATENT DOCUMENTS

| | | | |
|---|---|---|---|
| 2725299 | 12/1978 | Fed. Rep. of Germany | |
| 1570266 | 4/1978 | United Kingdom | |
| 2116634 | 9/1983 | United Kingdom | 418/206 |

Primary Examiner—William L. Freeh
Attorney, Agent, or Firm—Burns, Doane, Swecker & Mathis

[57] ABSTRACT

In a Roots blower having a casing, two rotors rotatably housed within the casing, and at least two grease-enclosing bearing units to rotatably support the rotors, characterized in that a bypass groove is formed for each of the bearing unit so as to communicate between a first chamber defined by the casing and the rotors on the side of one axial end of the bearing unit and a second chamber formed by the casing and the bearing unit on the other axial side of the bearing unit, and in that a pair of pressure loaded seal rings (or lip seals) is disposed on axially opposite sides of the bearing unit in such a way that one periphery of each seat ring is secured to a stationary portion of the bearing unit and the other periphery thereof is free to move selectively into or out of contact with a movable portion of the bearing unit according to the presence or absence of a pressure difference produced by a delay in a pressure-balancing action of the bypass groove between the two chambers so that the seal ring prevents bearing grease from leaking. The seal ring is of a U- or L-shape.

4 Claims, 4 Drawing Sheets

FIG. 1
(PRIOR ART)
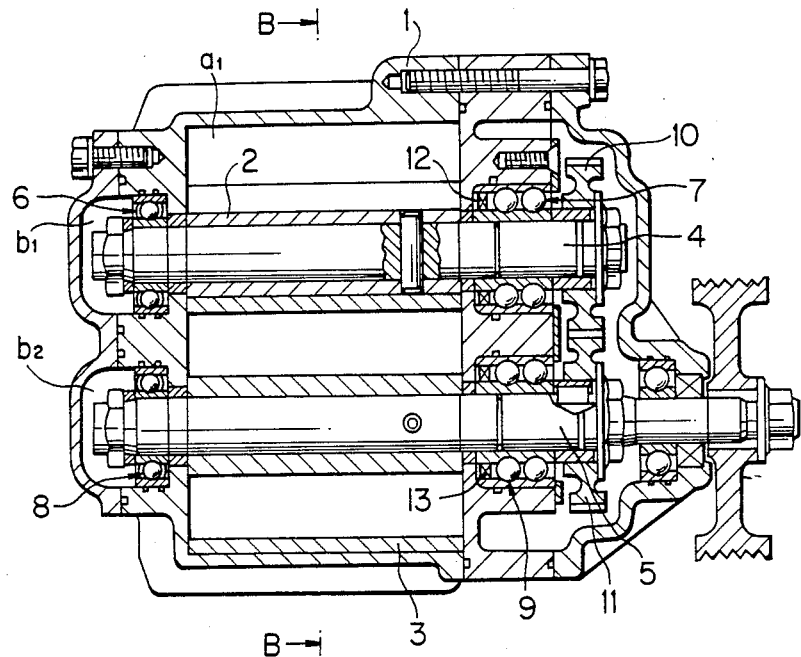
FIG. 2 (PRIOR ART)
FIG. 3 (PRIOR ART)
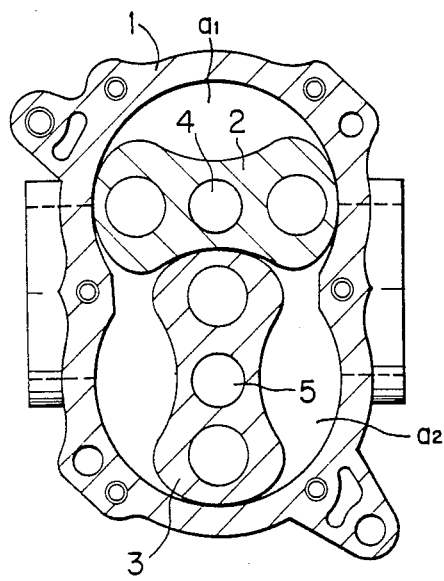

ROOTS BLOWER

BACKGROUND OF THE INVENTION

1. Field of the Invention

The present invention relates to a roots blower used with a supercharger of an engine for an automotive vehicle.

2. Description of the Prior Art

FIGS. 1 to 3 show an example of prior-art Roots blowers, in which the numeral 1 denotes a casing; 2 and 3 denote rotors rotatable within the casing 1; and 4 and 5 denote shafts rotatable together with the rotors 2 and 3, respectively. These two shafts are each supported by a pair of ball bearing units 6,7 and 8,9, respectively.

In these bearings, the bearing units 7 and 9 adjacent to timing gears 10 and 11, respectively are lubricated by a gear lubricant and leakage of the gear lubricant toward the rotor side can be prevented by two oil seals 12 and 13, respectively. On the other hand, the bearings 6 and 8 are lubricated by grease filling a ball bearing chamber C, and the grease is covered by two partitions 14 and 15 for prevention of grease leakage.

In the prior-art structure, however, because the grease within the chamber C leaks through gaps $e_1$ and $e_2$ during supercharge due to a difference in pressure between the chambers $a_1$ and $a_2$ and the chambers $b_1$ and $b_2$ caused by pressure fluctuations in the chambers $a_1$ and $a_2$ formed by the casing 1 and the rotors 2 and 3, there exist problems in that the bearings are not sufficiently lubricated due to lack of grease and therefore subjected to wear or seizure, thus shortening life of the bearings.

SUMMARY OF THE DISCLOSURE

With these problems in mind, therefore, it is a primary object of the present invention to provide a Roots blower which can solve the above-mentioned problem caused by pressure difference between two chambers formed in the sides of axially opposite ends of the bearing.

To achieve the above-mentioned object, in a Roots blower using grease-enclosing bearing units, the present invention is characterized in that a bypass groove is formed for each of the bearing units so as to communicate between a first chamber defined by a casing and rotors and a second chamber defined by the casing and the bearing unit on the opposite side of the first chamber and in that a pressure loaded seal ring (or lip seal) of a U- or L-shaped crosssection is disposed on on each axially side (end) surface of the bearing unit.

In the Roots blower according to the present invention, since pressures in two chambers formed on both the sides (axially opposite ends) of the bearing unit are well balanced with each other, grease within the bearing unit will not leak under the normal condition. Further, when a pressure difference is produced momentarily between the two chambers, since a pressure loaded seal ring (or lip seal) on the higher pressure side is brought into contact with one axial side (end) surface of the bearing unit, a high pressure is not introduced into the bearing unit, so that the leakage of grease contained within the bearing units toward a low pressure chamber can be prevented.

In the Roots blower according to the present invention, even if pressure within two chambers on both the axial sides (ends) of the bearing units fluctuates, the grease enclosed in the bearing units will not leak out of either of the axial ends of the bearing units. When the pressure is relatively stable, pressure on both the sides of the bearing units can sufficiently be balanced due to the presence of the bypass groove. However, when the pressure fluctuates relatively violently, the pressure cannot sufficiently be balanced due to a pressure response delay through the bypass groove, so that it offers difficulty in perfectly preventing the leakage of grease.

In order to prevent grease from being leaked when pressure fluctuates violently, pressure loaded seal rings are provided. However, if a flat lip seal is adopted, since one end surface of the flat lip seal is in contact with one side (axial flat end) surface of the portion, which rotates relatively of the lip seal, of the bearing unit, there exist problems such that durability of the lip seal (flat seal ring) decreases and contact resistance thereof increases, thus the mechanical efficiency of the Roots blower being lowered. In the present invention, however, since the end surface of the lip seal is formed into a U- or L-shape, it is possible to reduce sliding resistance caused between rotating portion (inner race) of the bearing unit and the end surface of the lip seal. Further, since the duration during which the bearing rotating portion is in contact with the lip seal can be shortened because of the pressure balancing of the bypass grooves, the durability of the U- or L-shaped lip seal is not degraded.

BRIEF DESCRIPTION OF THE DRAWINGS

FIG. 1 is a side cross-sectional view showing a prior-art Roots blower;

FIG. 2 is a cross-sectional view taken along the line B-B in FIG. 1;

FIG. 3 is an enlarged cross-sectional view showing an essential portion shown in FIG. 1;

DETAILED DESCRIPTION OF THE PREFERRED EMBODIMENTS

Figure 4:
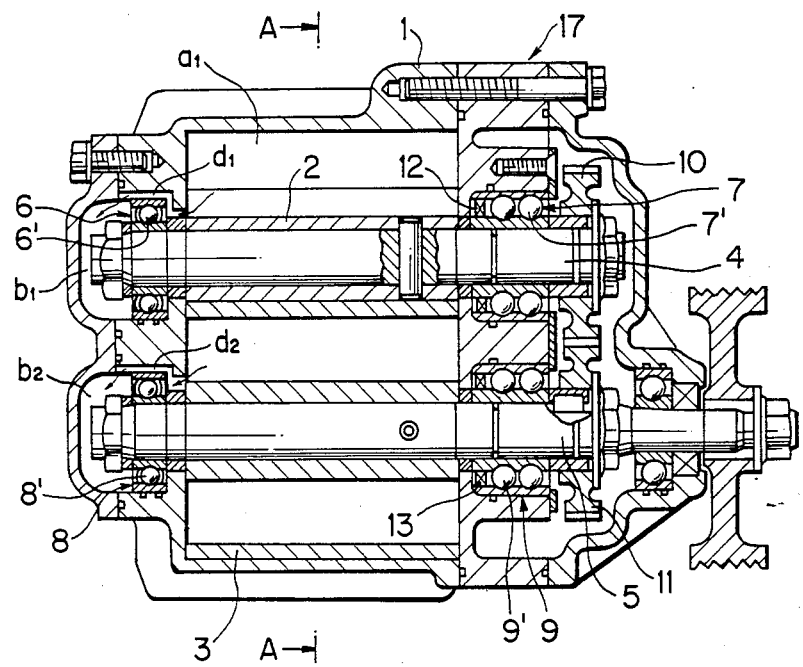
FIG. 4 is a side cross-sectional view showing an embodiment of the Roots blower of the present invention.
Figure 5:
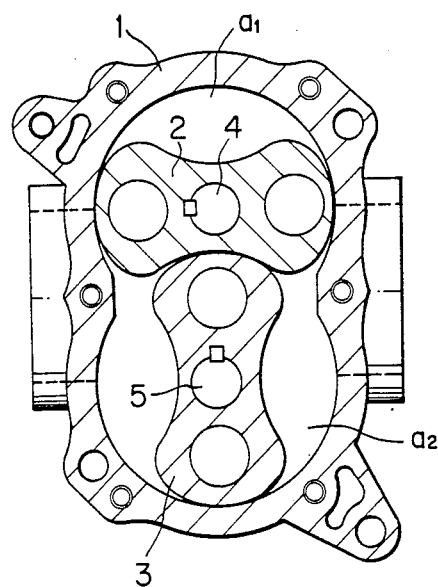
FIG. 5 is a cross-sectional view taken along the line A-A in FIG. 4.

An embodiment of the Roots blower according to the present invention will be described hereinbelow with reference to FIGS. 4 to 6, in which the same or similar parts are designated by the same reference numerals.

In the drawings, the numeral 1 denotes a casing; 2 and 3 denote rotors rotatable within the casing 1; 4 and 5 denote shafts rotatable together with the rotors 2 and 3, respectively. These two shafts 4 and 5 are each supported by two bearing units 6,7 and 8,9, respectively, comprising ball bearings (6',7'; 8',9') in this embodiment.

Two chambers $a_1$ and $a_2$ are formed by the casing and the rotors 2 and 3, respectively. These chambers $a_1$ and $a_2$ communicate with two other chambers $b_1$ and $b_2$ formed on the opposite side of the bearing units 6 and 8 through a bypass groove $d_1$ and $d_2$, respectively.

Figure 6:
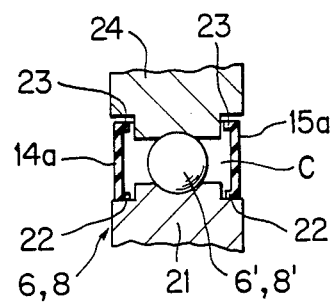
FIG. 6 is an enlarged cross-sectional view showing an essential portion shown in FIG. 4.
Figure 8:
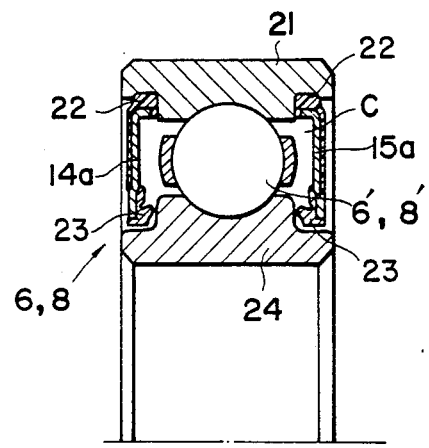

Further, as shown in FIG. 6, two lip seals 14a and 15a of a U-shaped cross section are disposed on both side surfaces of each of the ball bearing units 6 and 8 in such a way that one end 22 of the lip seal is fixed to a bearing stationary portion (outer race) 21 and the other end 23 thereof is free being separated away from the bearing movable portion (inner race) 24. Therefore, when external pressure rises, the lip seals 14a and 15a are brought into contact with the bearing rotating portion 24 to prevent a rise in pressure within the chamber C of the ball bearing unit. Therefore, lubricant grease filling the chamber C is prevented from leaking through the lip seal 15a toward the chambers $a_1$ and $a_2$. Further, lip seals 14a, 15a of an L-shaped cross section are also preferable in shape and are illustrated in FIG. 8.

Figure 7:
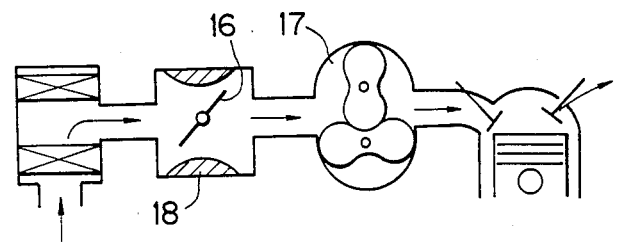
FIG. 7 is an arrangement view showing a Roots blower incorporated in an automotive vehicle engine and FIG. 8 is an enlarged cross-sectional view showing a second type of sealing arrangement for use in the apparatus of FIG. 4.

FIG. 7 shows an exemplary layout in which a Roots blower 17 is mounted as a supercharger on an automotive vehicle engine. In this example, the Roots blower 17 is arranged in the downstream of a carburetor 18. When a throttle valve 16 is closed, a high vacuum pressure is generated in the chambers $a_1$ and $a_2$ of the Roots blower 17; when the throttle valve 16 is open, a positive pressure is generated in the same chambers $a_1$ and $a_2$.

In other words, pressure applied to the lip seal 15a disposed on the rotor-side surface of the bearing unit 6 or 8 is not constant, but always changes according to engine operating conditions. However, in the present invention, since the same pressure is also applied to the chambers $b_1$ and $b_2$ through the bypass grooves $d_1$ and $d_2$, respectively, the lip seal is balanced in pressure. Therefore, grease within the chamber C receives the same pressure from both the sides and stays therewithin without leakage.

However, when the pressure within the chambers $a_1$ and $a_2$ changes violently the bypass grooves $d_1$ and $d_2$ cannot perfectly balance two pressures applied to the chamber C from both the sides thereof; that is, pressure within the chambers $b_1$ and $b_2$ cannot match that within the chamber $a_1$ or $a_2$ due to a pressure response delay through the bypass groove. In this case, either one of the lip seals 14a and 15a is brought into contact with the rotating portion 24 of the bearing unit 6 or 8 to reduce pressure difference within the chamber C, so that it is possible to prevent grease from leaking through the other of the lip seals. For instance, when pressure within the chamber $a_1$ is higher than that within the chamber $b_1$, the grease is sealed by the lip seal 15a; when pressure within the chamber $a_1$ is lower than that within the chamber $b_1$, the grease is sealed by the lip seal 14a. Therefore, the grease will not flow out of the chamber C in any operating conditions of the carburetor 18.

The bearing unit may comprise ball bearings, needle bearings, conical roller bearing of the like known bearings.

It should be understood that modifications may be made in the art without departing from the concept and scope of the present invention as disclosed and claimed.

What is claimed is:

1. A Roots blower having a casing, two rotors rotatably housed within the casing, and at least two grease-enclosing bearing units to rotatably support the rotors, characterized in that a bypass groove is formed for each of the bearing units so as to communicate between a first chamber defined by the casing and the rotors on one axial side of the bearing unit and a second chamber formed by the casing and the bearing unit on the other axial side of the bearing unit, the bypass groove being provided adjacent to the outer portion of the bearing unit within the casing and extending essentially along an axis of the bearing unit, and in that a pair of pressure loaded seal rings are disposed on axially opposite sides of the bearing unit in such a way that one periphery of each seal ring is secured to a stationary portion of the bearing unit and the other periphery of the seal ring is free to move selectively into or out of contact with a movable portion of the bearing unit according to the pressure or absence of a pressure difference produced by a delay in a pressure-balancing action of the bypass groove between the first and second chambers. thereby preventing bearing grease from leaking out of the bearing unit.

2. The Roots blower as set forth in claim 1, wherein said seal ring is of a U shape in cross section.

3. The Roots blower as set forthin claim 1, wherein said seal ring is of an L shape in cross section.

4. The Roots blower as set forth in claim 1, wherein any one of said seal rings is disposed so as to be urged to contact on the movable portion of the bearing unit when the pressure difference occurs.

* * * * *